United States Patent [19]
Sumner

[11] Patent Number: 6,049,657
[45] Date of Patent: *Apr. 11, 2000

[54] MARINE PIPELINE HEATED WITH ALTERNATING CURRENT

[76] Inventor: Glen R. Sumner, 8306 Leafy La., Houston, Tex. 77055

[*] Notice: This patent issued on a continued prosecution application filed under 37 CFR 1.53(d), and is subject to the twenty year patent term provisions of 35 U.S.C. 154(a)(2).

[21] Appl. No.: 08/699,600

[22] Filed: Aug. 19, 1996

Related U.S. Application Data

[60] Provisional application No. 60/014,145, Mar. 25, 1996.

[51] Int. Cl.$^7$ ....................................................... E03B 7/10
[52] U.S. Cl. ............................................. 392/469; 324/425
[58] Field of Search .................................... 392/465, 466, 392/468, 469, 471, 472, 479, 480, 482–490, 497, 478; 138/145, 146, 149, 156; 405/158, 165, 168; 324/425; 428/403

[56] References Cited

U.S. PATENT DOCUMENTS

| | | | |
|---|---|---|---|
| 3,293,407 | 12/1966 | Ando | 392/469 |
| 3,591,770 | 7/1971 | Ando | 219/540 |
| 3,617,699 | 11/1971 | Othmer | 392/469 |
| 3,706,872 | 12/1972 | Trabilcy | 219/535 |
| 3,777,117 | 12/1973 | Othmer | 392/469 |
| 3,975,617 | 8/1976 | Othmer | 392/469 |
| 4,151,003 | 4/1979 | Smith et al. | 106/278 |
| 4,228,399 | 10/1980 | Rizzo et al. | 324/425 |
| 4,449,852 | 5/1984 | Muszynski | 405/168 |
| 5,006,683 | 4/1991 | Rapin et al. . | |
| 5,020,481 | 6/1991 | Nelson | 122/494 |
| 5,182,792 | 1/1993 | Goncalves . | |
| 5,241,147 | 8/1993 | Ahlen | 219/638 |
| 5,256,844 | 10/1993 | Grosvik et al. . | |
| 5,289,561 | 2/1994 | Filho . | |

FOREIGN PATENT DOCUMENTS 2 084 284  9/1980  United Kingdom .

OTHER PUBLICATIONS

Lervik, Jens Kristian et al, Direct Electrical Heating of Subsea Pipelines, *Proceedings of the Third* (1993) *International Offshore and Polar Engineering Conference*, Jun. 6–11, 1993, vol. II, pp. 176–184.

Ahlen, C.H., Electric Heat Tracing of Submarine Pipelines Induction Heating by the Statoil Invented "ITTI"—System, *Proceedings of the First* (1991) *International Offshore and Polar Engineering Conference*, Aug. 11–16, 1991, vol. II, pp. 331–334.

Takaki, H. et al, Application of Electric Heat Tracing System to Offshore Pipelines, *Proceedings of the Third* (1993) *International Offshore and Polar Engineering Conference*, Jun. 6–11, 1993 vol. II, pp. 185–189.

Memo from Carl Langner at Shell Development to Mike Dupree at Shell Oil, Apr. 27, 1995.

Epstein, Fred S. and White, Gary L., *Understanding Impedance Heating*, Chemical Engineering, pp. 112–118, May 1996.

*Primary Examiner*—Tu Ba Hoang
*Attorney, Agent, or Firm*—R. William Beard, Jr.; Frohwitter

[57] ABSTRACT

A marine pipeline comprising (a) pipe, (b) a coating that electrically insulates the pipe from sea water, and (c) an alternating current heating circuit comprising the pipe in series with ambient sea water, wherein the heat generated by alternating current flowing in the pipe is for improving flow of fluids through the pipeline. A marine pipeline comprising: a) pipe, b) a coating that electrically insulates the pipe from ambient sea water, and c) an alternating current heating circuit that is grounded to the ambient sea water and comprises the pipe in series with a return conductor, wherein the heat generated by the alternating current flow in the pipe is for improving flow of fluids through the pipeline.

20 Claims, 6 Drawing Sheets

FIGURE 8

MARINE PIPELINE HEATED WITH ALTERNATING CURRENT

This application claims the benefit of U.S. Provisional Application No. 60/014,145, filed on Mar. 25, 1996.

BACKGROUND OF THE INVENTION

1. Field of the Invention

This invention relates to heated offshore pipelines, more particularly to pipelines electrically heated by AC current flowing through a pipeline made of electrically conducting pipe that is electrically insulated from the sea water with a waterproof coating.

2. Related Art

The use of the technique known as "subsea", or "offset" production to produce offshore oil and gas from offshore reservoirs is increasing. This technique employs small, submerged pipelines known as "flow lines" that are laid along relatively short routes between the submerged wellheads and a gathering point such as a nearby platform. For a variety of reasons it will often be beneficial or necessary to take measures to maintain high temperatures in the fluid flowing in subsea flow lines, One way to this is done is to add insulation.

Because flow lines are generally small, relatively short, and often in deep water, installation from reel barges is often faster and less expensive than installation using lay barges which depend on stringing the pipe joints together on deck. Reeling, however, generally precludes the use of a concentric pipe with an insulation-filled annulus except on very small flow lines, due to the stiffness of the composite pipe. Various plastic, rubber or foamed plastic coatings have been used to insulate reel laid pipes, but these are both more expensive for a given volume, and more conductive than conventional insulating materials that can be used in a concentric pipe design.

Because several flow lines are often laid along the same short route, it is sometimes less expensive to assemble the flow lines onshore and tow a bundle of several pipelines to the offshore site, particularly if insulation is needed. These bundles are usually assembled inside a "carrier" pipe that serves to reduce submerged weight and to protect the flow lines during the journey. The bundle may be towed off-bottom at a "controlled-depth", in which case the weight of the bundle is accurately controlled to be very near to the buoyant force, or it may be kept just slightly heavier than the buoyant force so that it stays on the bottom during trip without too much drag. In the controlled depth tow method, the void space between the carrier pipe and the flow line bundle is generally filled with ballast to sink the pipeline bundle when it reaches its destination. Liquids or slurries that partially solidify have been used to serve the combined purpose of insulation and ballast. For bundles that are towed along the sea bed, the additional ballast provided by filling the flow lines themselves may be adequate. In such cases, inexpensive, conventional insulating materials have been installed in the dry space between the bundled flow lines and the casing pipe. These insulating materials are more effective and less expensive than the submersible insulating materials used on reeled pipelines. This is taken to be a considerable advantage of this method of installing flow line bundles when insulation is desirable or necessary. In some cases this can be the deciding factor in whether to tow the pipelines, or lay them separately from a reel barge. One disadvantage of housing the bundled lines inside a casing pipe is that in very deep water the wall thickness required to keep the casing pipe from collapsing under the hydrostatic pressure makes it difficult to achieve the desired buoyancy. This has been overcome in some cases by pressurizing the casing pipe with nitrogen, but pressurizing also adds expense due to the cost of the nitrogen itself, the required filling apparatus and time to fill the casing pipe. The flotation pipe in this method is also larger than would be required to add the required buoyancy, because part of the volume of the casing pipe is occupied by the flow lines. This is space that does not contribute buoyant force as it would if the flow lines were outside the floatation pipe. Another disadvantage of this design is that some sort of carriage system is needed to get the flow line bundle pulled into the casing pipe. It would be quite difficult to connect one prefabricated length of such a bundle to another that is already in the water. Precisely because of this difficulty, most towed pipeline bundles have been fabricated in a single section on shore. This requires a very long section of land with a beach front.

The benefit of increasing the thickness of a given insulating material diminishes with its thickness, but the benefit of decreasing the conductivity of a given thickness of insulating material increases linearly, and inversely. It is, therefore, not possible to generalize when comparing the merits of a low conductivity material applied one way to a high conductivity material applied in a different way. For long pipelines it may be impractical to add enough insulation to achieve the desired result. In other cases it may be practical to adequately insulate with a low conductivity material, but not a higher conductivity material. In either case, the practical length can be increased by adding more heat than is contained in the produced fluids. Heating can also be useful and cost-effective even where it is not essential to operating the pipeline.

Heating pipelines is a common practice on land, but only a few offshore pipelines have been heated. One reason for heating pipelines is that many of the problems of cooling in pipelines are of a temporary or transient nature due to changing flow conditions. Some insulated pipelines carry materials that will freeze or turn to wax if flow is stopped, but which at full flow can be transported through the pipe fast enough to avoid cooling problems. In such cases, the pipeline must quickly be flushed with a different fluid after it is shut down. Insulation can be used to slow heat loss enough to allow time to flush the line in an un-planned shut down but the ability to heat the pipeline can provide an infinite "shut-down window" and eliminate the need to flush the line. Another type of transient flow condition is declining flow rates that occur in flow lines that carry subsea well production. Because temperature drop depends on the length of time the fluid is in the pipe, the temperature loss increases as the flow rate decreases. In such cases the peak power need for heating may not occur until near the end of the life of the oil or gas well, meaning that much of the cost of heating is deferred. If a less effective insulating system can be installed at lower cost, then the combined cost of heat and insulation may be lower than the cost of a more effective insulation system. The problems associated with temperature are not entirely predictable, so with non-heated line the worst case must be paid for in advance. The heated line can be operated with just enough heat to suit the real need.

Pipelines can be heated by pumping hot water or steam through a separate heating pipes that are thermally connected to the pipeline. Where waste heat is not available, electric heating usually more cost effective, but electric heating has rarely been used offshore due to the complications of using high power heating underwater.

One of the oldest ways to electrically heat pipelines is to use the pipe itself as an impedance heating element. For pipes made of magnetic material, alternating current tends to flow near the outside surface of the pipe due to self-induced eddy currents in the pipe wall. If the pipe wall is thick, this can effectively insulate the current from the fluid inside the pipe, thus allowing this method to be used even when the fluid flowing in the pipeline is somewhat conductive. While conceptually very simple, this method has several disadvantages, depending on the case. Because the resistance of steel pipelines is low, high currents are needed to generate enough heat to significantly effect the fluid temperature. Considerable power is lost through the return path unless resistance is quite low. This requires large return cables, and generally precludes earth as the return path. Furthermore, insulating materials typically used to insulate land pipelines are not designed as electrical insulators, and are not suitable for insulating high voltage. Building codes, therefore, limit the voltages to levels that are not hazardous to humans. This effectively limits the use of this heating method to pipelines shorter than those typically used offshore.

One method that has been used to overcome these problems is to cause induction heating in one or more small pipes that are attached to the pipeline and house an electrical conductor that carries high voltage alternating current, using the small pipe as the return current path. Heat is induced in the small pipe, but the same "skin effect" phenomenon that causes current to flow on the outside of a single conductor causes the current to flow on the inside of the magnetic outer conductor of coaxial conductors carrying current in opposite directions. This method, therefore, insulates both the outside and the inside of the pipeline, allowing high voltage heating of conductive fluids without risk of electrical shock. This is described in U.S. Pat. Nos. 3,617,699, 3,777,117 and 3,975,617 and is known as skin effect heat tracing. It is common on land, and it has been used on at least one offshore pipeline. In that pipeline, the heating tubes were pre-installed on individual pipe joints, over which larger, concentric pipes were installed from the end to house the foam insulation. Each pipe joint contained a junction box that allowed connection of the heating tubes and wires offshore, after two pipes were joined. Split sleeves were installed over the joint, and welded. Because the pipes were welded offshore during the lay process, this a time consuming process was very expensive.

U.S. Pat. No. 5,241,147 addresses these problems by proposing to induce heat in the pipe with a magnetic field created by passing an AC current through wires placed outside the insulation. This, however, may leave the wires vulnerable.

U.S. Pat. No. 3,975,617 discloses that conductors placed near the pipe can be used for the combined purpose of inducing heat in the pipe and power transmission to production equipment.

One method previously noted teaches that the steel windings in flexible pipe of the type used offshore can be used as a direct current, resistive heating element with earth as the return current path. This depends plastic or rubber layers in hose or flexible pipe electrically insulating the steel windings from sea water, and from conductive fluids inside the pipeline. The disadvantage of using DC current is that the sea water will act as an electrolyte, and the steel windings could be rapidly consumed by electrolysis.

SUMMARY OF THE INVENTION

In this invention a pipeline is electrically insulated from the surrounding sea water with waterproof coatings and the pipeline conducts alternating current that generates impedance heating in the pipeline. The power source is grounded to sea water. In the simplest embodiment the return current path is directly through sea water, but current can also be returned through an insulated cable or through another pipeline, using sea water for grounding in each case. In the preferred embodiment the electrical insulation will also serve as a thermal insulating coating. These differ from AC impedance heating applications as used on land pipelines in the prior art in the following ways: First the electrical insulating material is continuous, waterproof and capable of insulating the pipeline from the sea water under sustained hydrostatic pressure. Second, by grounding the power supply to sea water, the entire submerged pipeline is inherently safe from shock and explosion because the insulation can only fail to ground, there is no free oxygen in the path to ground and there is no potential for a spark. This combination makes it feasible to apply the high voltage needed to use impedance heating for offshore pipelines of typical length. Because the salt water itself is a far better conductor than earth, it can be used as the primary return current path without the excessive power loss than would occur if an earth ground were used as the primary return current path.

If one type and size pipe is used throughout the line, then the heat generated per unit length of the pipeline is uniform along the length. In other embodiments of the invention, the heat can be distributed differently by changing the pipe material or wall thickness, or by adding a different heating means in series with all or some of the length of pipe to be heated. The following sections disclose means for electrically insulating the pipeline over its entire length, for connecting power to the pipeline, and for connecting the pipeline to the platform while maintaining electrical continuity through the pipeline.

DETAILED DESCRIPTION AND VARIOUS EMBODIMENTS OF THE INVENTION

Heating pipelines is only cost-effective if the thermal resistance between the heating element and the fluid in the pipeline is low compared to the thermal resistance between the heating element and the environment. If the pipeline is submerged, the available ways to achieve this are constrained by the electrical and thermal conductivity, and hydrostatic pressure of sea water. This is further complicated by the high cost of time during offshore pipeline installation. Many of the methods for heating onshore pipelines were conceived to overcome the problem of electric shock. In this invention the electrical conductivity of sea water is used as a benefit by serving as an inherently safe ground and return current path. An electrically conductive pipeline is electrically insulated from the surrounding sea water with a waterproof coating and the pipeline conducts alternating current that generates impedance heating in the pipe. Preferably one coating will electrically and thermally insulate the pipeline.

The method has the following features:

1) The pipeline is made from an electrically conductive material. If the pipe wall is thick enough and the pipe material is magnetic, conductive fluids can be carried in the pipeline without applying an insulating coating inside the pipeline.

b 2) One leg of the AC power supply is connected to the pipeline and the other leg is grounded to sea water.

3) The end of the pipeline nearest the AC power supply is insulated from sea water or ground, typically by insulating it from the offshore platform that supports the power supply.

4) The heated portion of the pipeline is electrically insulated from sea water with a waterproof coating.

The method of achieving each of these requirements is discussed in the following paragraphs.

Most offshore pipelines are made of steel, which is both electrically conductive and magnetic. In most embodiments the skin effect will effectively insulate the pipe from the fluid inside the pipe the pipe wall will be thick enough that little current reaches the fluid because the pressure in offshore pipelines usually requires that the pipe wall be thick enough for that purpose. In other cases increasing frequency will reduce the depth of the layer of pipe in which current flows, and in yet other cases the inside diameter of the pipeline will be insulated over a significant length.

Figure 1:
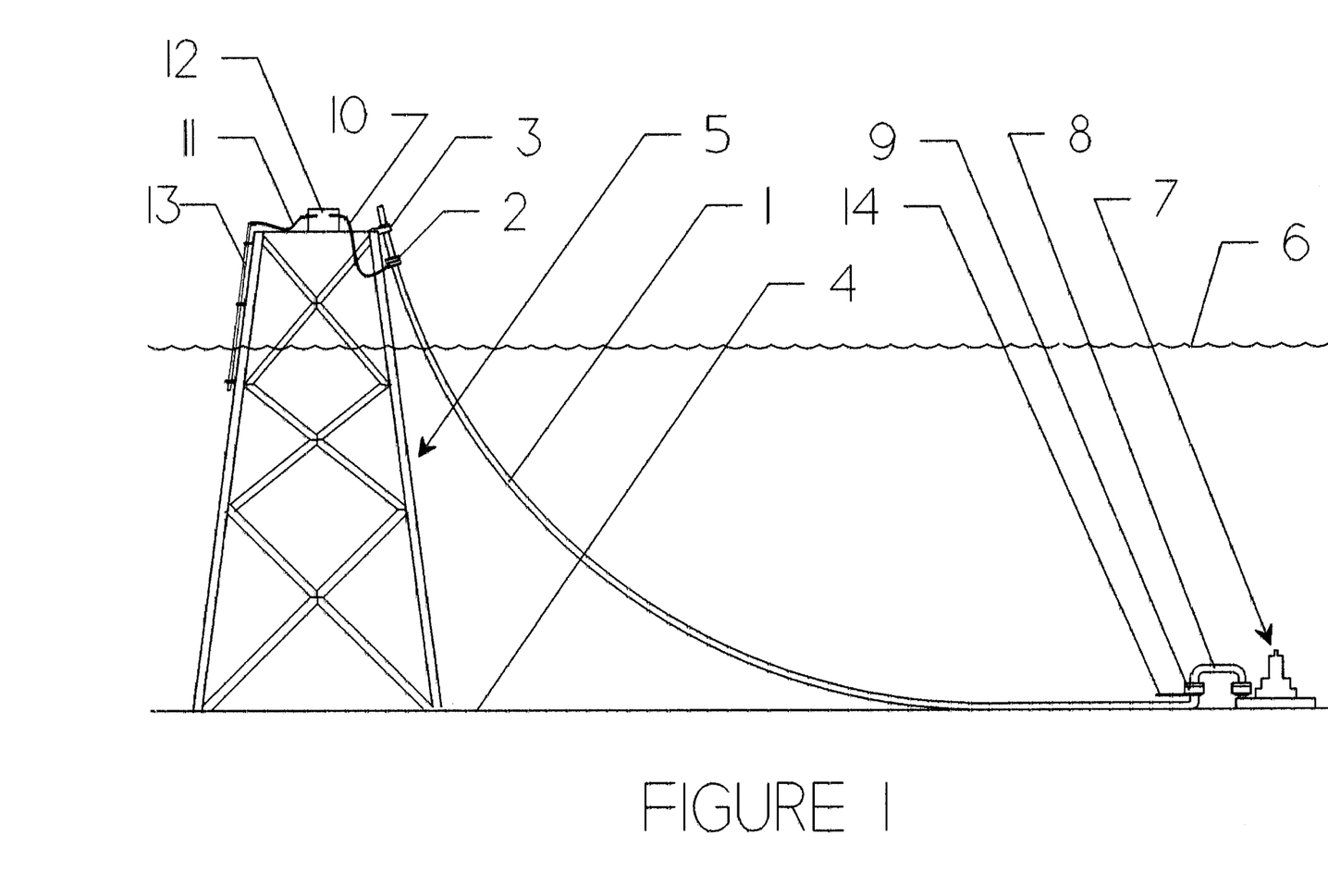
FIG. 1 shows a pipeline suspended from a platform in a catenary to the sea bed, extending from there to a subsea wellhead. The pipeline is electrically insulated from the ambient sea water and insulated from the platform with an insulating above the waterline. The terminal comprises an electric terminal that connects the pipeline to one leg of the AC power supply. The other leg of the AC power supply and the end of the pipeline near the subsea wellhead are connected to sea water electrodes. The sea water completes the circuit between the sea water electrodes.

Flanges and joints that insulate one section of a pipeline from another are commonly used to isolate the cathodic protection system of a pipeline from the facility it serves. Examples are shown in Advance Produces and Systems Company's product brochures "Flange Insulating Gasket Kits" and "Iso-Joint. In the preferred arrangement, the pipeline will contain no fluid connectors in the section to be heated so as to avoid the complication, expense and questionable reliability of underwater connectors that are capable of carrying high currents and high fluid pressure. It may be preferable to put the power terminal and the insulating joint above the waterline. To meet both of these goals the pipeline will be installed without fluid connectors in the heated section of the pipeline. In shallow water this can be achieved by pipeline installation methods known in the prior art as "stalking", "J-Tube pulls", "habitat welding" or with a "catenary riser". In the stalking method, an elbow is welded onto the pipeline when the barge is near the platform. The pipeline is then lowered to the bottom as vertical sections are welded together. To use this method for the purposes described here, the elbow would be thermally and electrically insulated. A J-Tube is "J" shaped pipe that is previously installed on the platform, through which the pipeline is pulled to form a riser. "Habitat welding" is used to make an under water pipeline welds inside a dry bubble that is created by pumping air or gas under a "welding habitat". In some applications the same methods used to cast insulation at the field joint on deck will also be used in a welding habitat. "Catenary risers" are used in deep water pipelines that are installed using vertical pipe lay methods (J-lay or reeling). The riser is connected after laying toward the platform by simply transferring the vertical end of the pipeline from the lay ship to connecting a hanger on the platform, leaving it hanging in a "J" shaped catenary to the sea bed. The suspended portion of the pipeline is called a "catenary riser. FIG. 1 shows a pipeline connected to a platform with a catenary riser. Depending on the application, the platform can supported on the sea bed, on a ship, a barge, or a semi-submersible vessel, but in other embodiments of this invention the pipeline will extend from shore, in which case a foundation or the ground itself replaces the platform.

Figure 2:
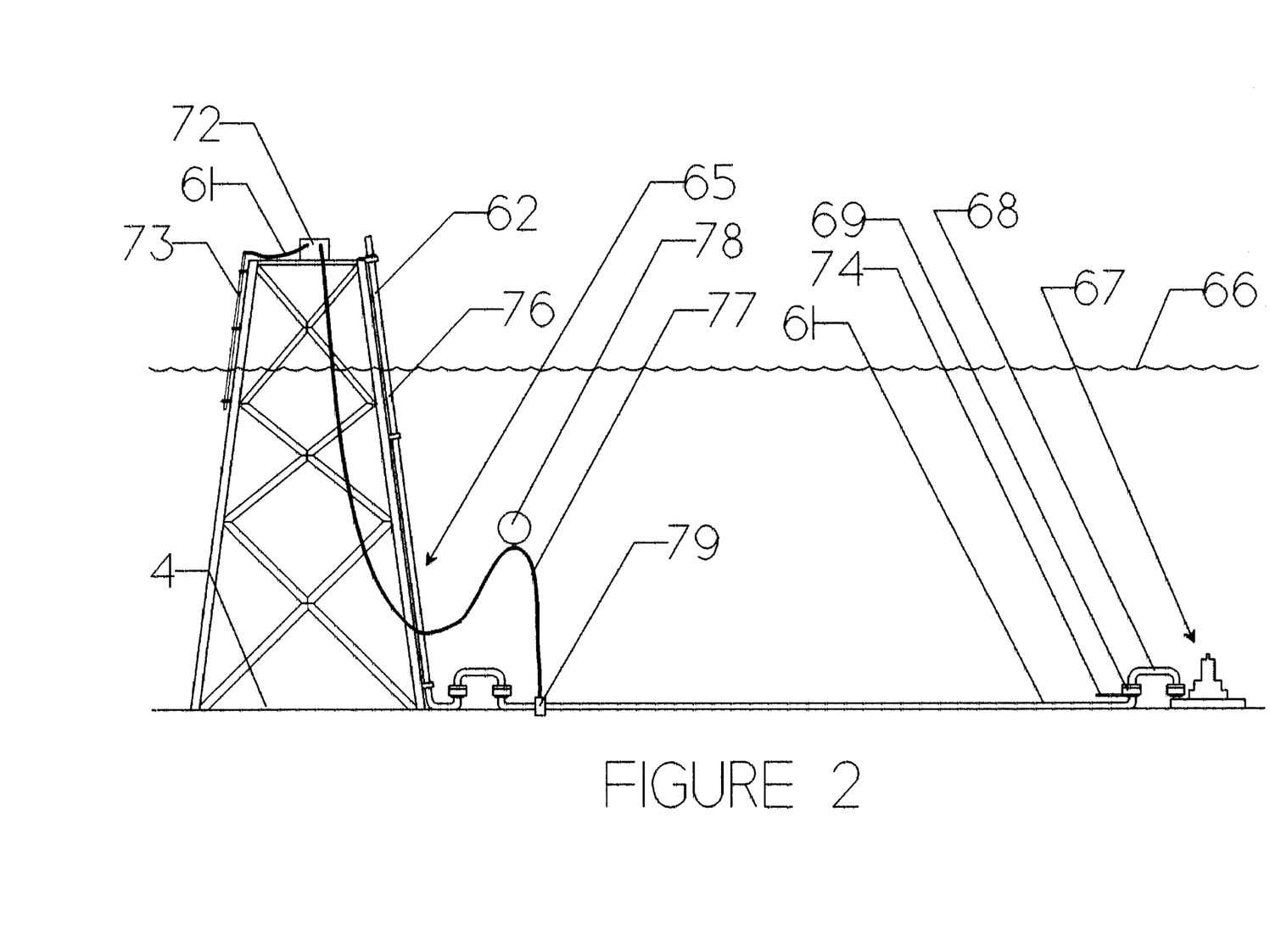
FIG. 2 shows an offshore pipeline that is connected to a pipeline riser at the sea bed and extends to a subsea well head. The riser is attached to an offshore platform, and the pipeline is electrically insulated from ambient sea water and from the riser by a submerged insulating joint. The insulating joint comprises an electric terminal that connects a flexible power lead to an AC power supply on an platform. The other leg of the AC power supply, and the end of the pipeline near the subsea wellhead are connected to sea water electrodes. The sea water ground completes the circuit between the sea water electrodes.
Figure 4:
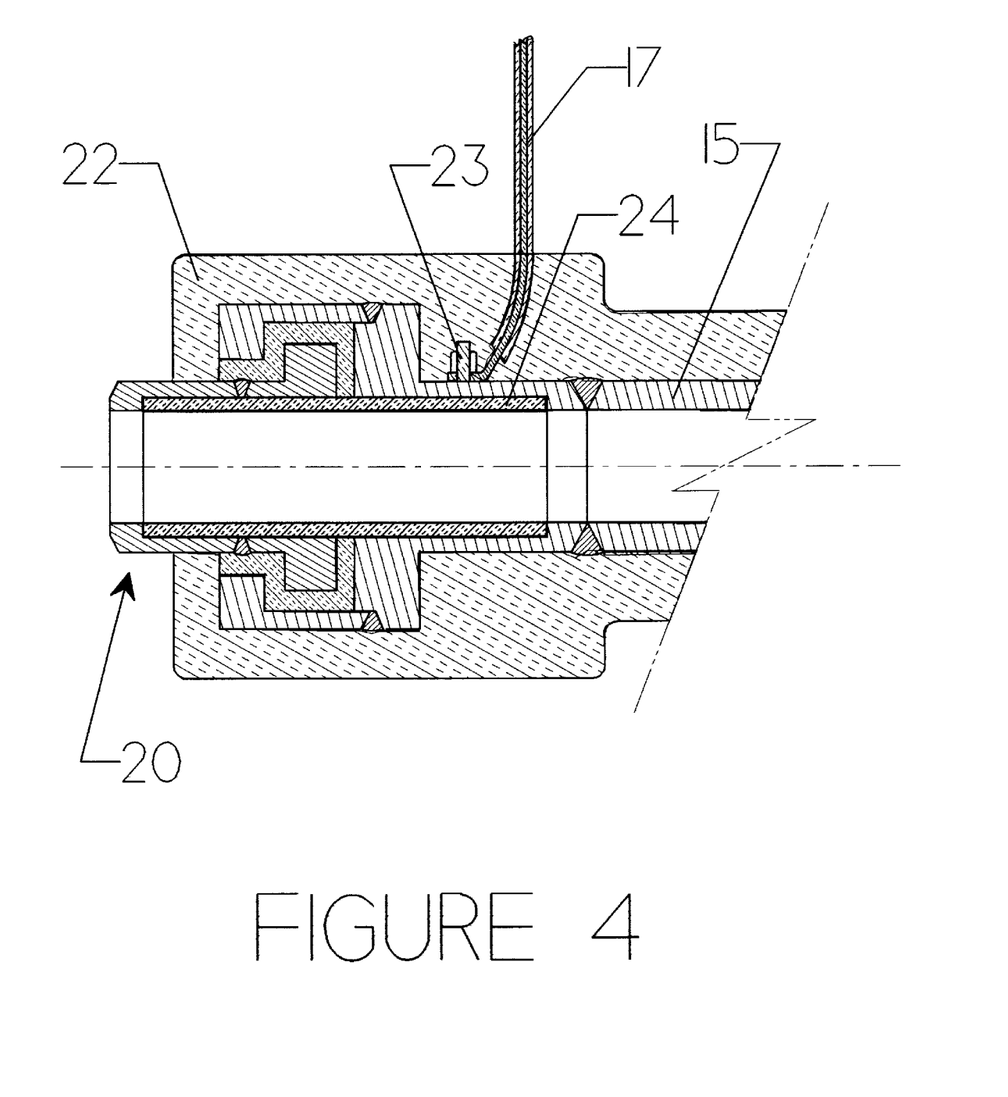
FIG. 4 is an elevation section view of the electrically insulating joint and terminals 79 and 99 in FIGS. 2 and 3, respectively.

In applications where submerged fluid connections are used to connect the pipeline to the riser, submerged electrical connections can be avoided by using a submerged insulating joint and connecting a flexible power cable to a waterproof terminal on the pipeline before it is submerged. The lead can either be strapped to the pipeline and then floated to the surface, or it can be paid out as the pipeline is lowered to the sea bed. A pipeline constructed by this method is illustrated in FIG. 2. The optional buoy 78 on the cable 77 can reduce the risk breaking the cable without increasing the risk it will become tangled. The buoy is particularly helpful for floating platforms. FIG. 4 shows an elevation section view of the submersible electric insulator/terminal 79 in FIG. 2. This employs an insulating joint similar to insulating joints of the prior such as the "ISO joint", but which also comprises a terminal connection. It is possible to separate the two functions, but for use on pipelines that will carry conductive fluids there can be a benefit to combining the two functions. The skin effect causes current to flow near the outer surface of the pipeline, but in the region between the insulating joint and the terminal the magnetic fields are more complicated. The inside insulating sleeve or coating 24 in FIG. 4 insulates the pipeline from the fluid in this area. The additional resistance is proportional to the length of the inside coating.

If the insulated area is long enough, impedance heating can limit current flow into the fluid from a thin wall pipeline. If all the parameters are known it is possible to use this to cause resistance heating in the fluid itself.

There is an argument in favor of connecting the electrical terminal and the insulating joint beneath the water line, even when there are no submerged hydraulic connectors. If the terminal is well isolated from any shock hazard the potential for spark could ignite escaped gas. In areas where this is deemed to be a hazard, most safety codes require that all electrical wiring and components be enclosed in housings or conduit that have been classified as being "explosion proof". Ports or pipe connections in the enclosures are specified, in part, by the length of the path through which a flame would have to travel to get outside the housing if hazardous gas reaches the electrical connection and cause an explosion inside. For that purpose the insulated pipe proposed here would be treated as an insulated wire. If the insulating joint and terminal were put inside an enclosure that extends through the waterline then very small gas leaks would accumulate. An alternative is to place the terminal and the insulating joint beneath the water line where it is inherently safe for several reasons. There is no spark path to ground and the hydrostatic pressure of sea water is higher than atmospheric pressure, so there is no pressure potential to cause gas to enter void space around the terminal. Finally, the terminal can be made to contain no void or gas-filled space into which an explosive mixture could enter. FIG. 4 shows a cross section of the submersible insulating joint 79 in FIG. 2 and 99 in FIG. 3.

Figure 5:
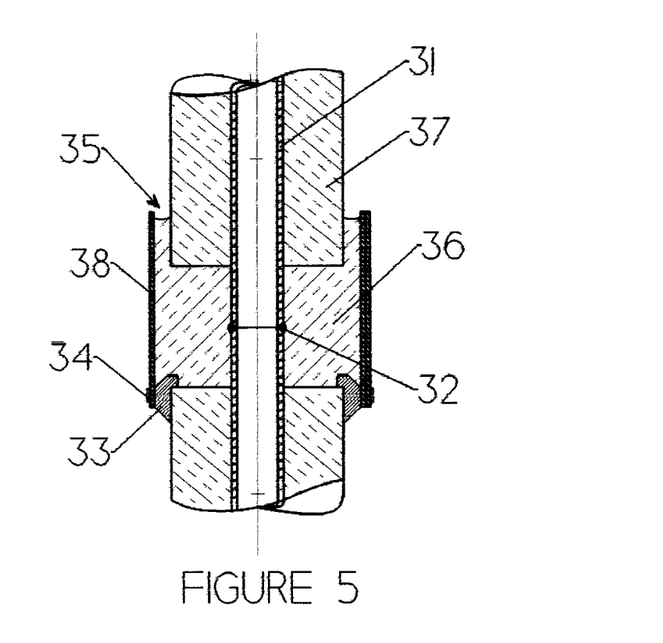
FIG. 5 shows an elevation cross section view of a pipeline field joint that has been insulated by casting an insulating material in a mold that encloses the weld that joins two vertical, insulated pipes, as would exist when pipes are installed offshore using the "J" lay method.
Figure 6:
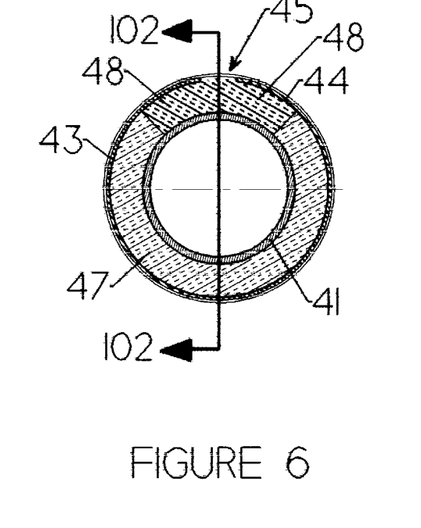
FIG. 6 shows an end cross section view taken through a pipeline field joint that has been insulated by casting an insulating material in a mold that encloses the weld that joins two horizontal pipes, as would exist when insulated pipes are installed offshore using the "S" lay method.
Figure 7:
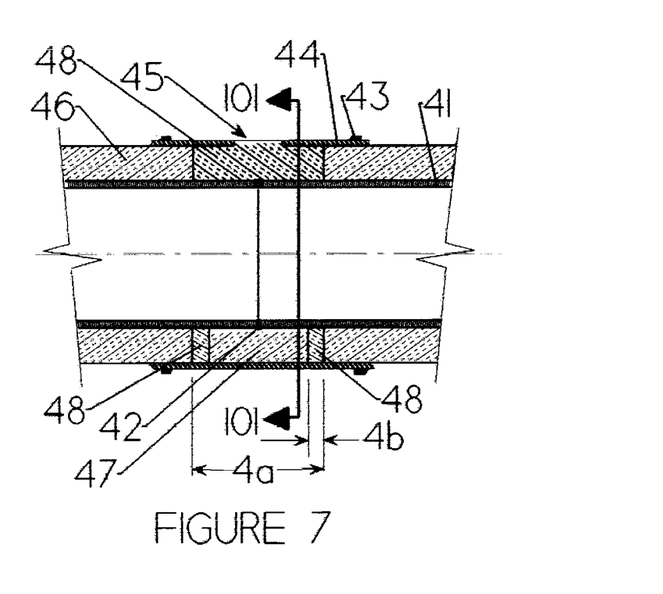
FIG. 7 shows an elevation section view of a cast field joint taken at section BB in FIG. 6.

Preferably the electrically insulating coating will also thermally insulate the pipeline. One suitable way to achieve this is to use bituminous compositions to thermally insulate pipelines and pipeline field joints. Field joints may be cast from liquid thermoplastics including, but not limited to bitumen. The bitumen or other thermoplastics can be made to form a seamless fusion bond to thermoplastic coatings previously applied to the rest of the pipe, to form a continuous, waterproof coating on the pipeline. In addition to its low thermal conductivity, bitumen has high dielectric strength and high electrical resistivity. It is now disclosed here that cast thermoplastics, and extended thermoplastics including bituminous compositions, can also be made to reliably fuse to produce a continuous, electrically insulating pipeline coating. Thermoplastics other than bituminous compositions, such as waxes, and polyolefins that can be cast or molded can also be used, but most are considerably more expensive and less effective as thermal insulators. If thermal insulation is applied separately, then the thickness required to electrically insulate the pipe will typically be less than 0.25 inches, and almost always be less than 0.5 inches. In these cases the thickness may be driven by toughness and the additional cost may be justified. While all coatings provide some thermal insulation, the cost of power is such that economics would require such coatings to be at least 0.5 inches thick to serve as the insulating coating. For the purpose here, electrically insulating coatings more than 0.5 inches thick are deemed to be thermally insulating coatings, although some embodiments may also comprise other thermally insulating coatings. Various thermosetting polymers such as polyurethane, and polyester resins can also be adapted to this purpose, but they are generally more expensive than bituminous compositions. These materials can also be extended with glass bubbles to lower their density and thermal conductivity. The integrity of the electrical insulation is of particular concern at field joints. FIG. 4 shows a cross section of cast field joints made where the pipe is laid vertically from a ship in the pipeline installation method known in the prior art as the "J-lay method". FIGS. 5 and 6 show cross sections of cast field joints for pipes that are assembled horizontally on barges or ships and installed using the installation method known in the prior art as the "S lay method. In this method the pipes are joined as they lay on horizontal rollers on the barge deck and the barge then pulls itself from under the joined pipes as they are deployed to the sea bed. If the insulation is very thick then thermoplastics may not be cool fast enough to completely solidify before the pipe is moved to the next station relative to the barge. In that case the field joint insulation will not support the weight of the pipe as it moves over the rollers. One solution is to add stiffeners to the mold, or simply use a mold that is made thick enough to support the pipe on the roller. FIGS. 6 and 7 show that a pre-cast insulating insert 47 can be used to reduce the length that mold must span and to reduce the time needed for cooling. The insert 47 is shorter than the space 4a between the insulation 46 so that the liquid field joint material 48 bonds to the insulation 49 and the insert 47. The insert 47 in FIGS. 6 and 7 is made of a flexible, somewhat elastic material that allows it to be slipped over the pipe 41 by expanding the opening at the top of the insert 47. The opening then springs back to keep the insert in place while the mold is being installed. If this "snap on" feature is not needed, the insert need only cover the section of the pipe that will support roller loads. This be less than half the circumference of the pipe, so inflexible materials can, therefore, also be used. The insert can be attached to, or made a part of the mold. If the mold is strong enough to cross the rollers, or if the insulation cools fast enough, no insert is needed. The preferred embodiments of the field joint and how it should best be applied are subject to wide variation within the scope of the invention. The field joint coating described above is said to be cast, but injection, spraying and wrapping are also contemplated. Other embodiments are envisioned where no field joints exist in most, or all of the pipeline, such as when the pipeline is installed by reeling.

If the pipe material and dimensions do not change through the length of the pipeline then the distribution of heat generated through the pipeline is constant, and cumulative along the length. The effect on the temperature near the inlet is, therefore, slight because only a small fraction of the heat is generated there. There are some applications where this uniform heat distribution is not the best use of power. An example is paraffin control. The temperature required to remove paraffin deposits is higher than the temperature at which they precipitate on the pipe wall. It may be more cost effective to periodically raise the temperature of the pipeline to above the melting temperature than to continuously heat the pipeline to above the paraffin precipitation temperature. If the temperature at the inlet of the pipeline is below the melting temperature of the paraffin deposits, but above the paraffin precipitation temperature then paraffin may accumulate near the wellhead. In this case the same amount of heat would be much more effective if it were applied near the inlet. One way to achieve this is to use pipe made of a different material or different wall thickness in different sections of the length. Another solution is to use the pipe as a conductor for current that operates a heater that exchanges heat near the end of the pipeline. One method is to connect a cable in series between the pipeline and the return current path, whether that be another pipeline or a sea water ground. The cable can then be coiled around a section of the pipeline at the end, increasing the number of ampere turns in the pipeline and causing induction heating that adds to the impedance heating near the end of the pipeline.

Figure 3:
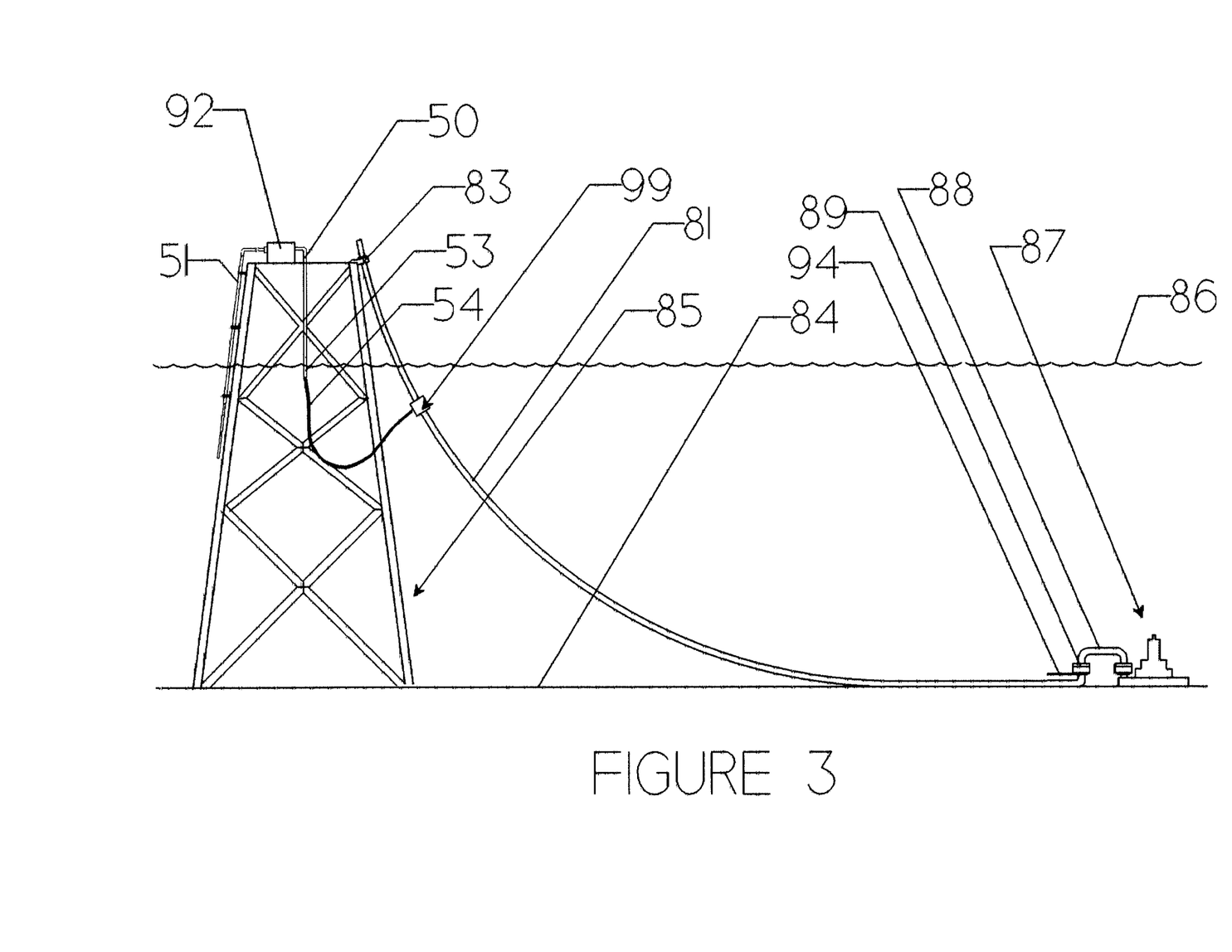
FIG. 3 shows a pipeline suspended from a platform in a catenary arc to the sea bed, extending from there to a subsea wellhead. The pipeline is electrically insulated from the ambient sea water with an insulating coating and is insulated from the platform with an insulating joint on the sea bed. The insulating joint comprises an electric terminal that connects the pipeline to one leg of an AC power supply. The connection is made with a cable to that extends through the waterline inside a conduit. The other leg of the AC power supply and the end of the pipeline near the subsea wellhead are connected to a sea water electrode. The sea water completes the AC circuit.

The heating can be concentrated near one end by simply putting the ground electrode nearer the electrical terminal section, that is by simply heating a shorter length of pipeline. Referring to FIG. 3, this can be done either by moving the insulating joint and terminal 99 nearer the wellhead or by putting the ground terminal 94 nearer the platform.

In other embodiments of the invention the current flowing pipeline can be in series with other types electrical apparatus or equipment, so that the AC current flowing through the pipeline can also power said electrical apparatus. In one such embodiment uses this power to run pumps in the well. In another embodiment, the equipment that is directly connected in series with the pipeline is the primary winding of a transformer coil that induces power in the secondary coil, that powers other equipment.

FIG. 1 shows a pipeline part 1 suspended from a platform in a catenary to the sea bed 4, extending from there to a subsea wellhead 7 that is connected to the pipeline part 1 with a jumper pipe 8 with quick connecting fluid connectors 9 at each end. The pipeline part 1 is electrically insulated from the ambient sea water and insulated from the platform by insulating joint 2. The joint 2 comprises an electrical terminal that electrically connects the pipeline part 1 to an electric cable 10 that is in turn, connected to one leg of AC power supply 12. The other leg of AC power supply 12 is connected by cable 11 to a ground electrode 13 that is submerged in sea water. The end of the pipeline part 1 near the subsea wellhead 7 is grounded to sea water via ground electrode 14, and the circuit is thereby completed through the sea water.

FIG. 2 shows an offshore pipeline part 61 that is connected near the sea bed 64 to pipeline riser 76. The pipeline part 61 extends from there along the sea bed 64 to subsea wellhead 67 to which pipeline part 61 is connected with jumper pipe 68 and connectors 69. The pipeline part 61 is also connected to ground electrode 74 near the wellhead 67, and is electrically insulated from ambient sea water and from riser 76 by submerged insulating joint 79. Insulating joint 79 comprises a terminal that connects pipeline section 61 through a flexible power lead 77 to AC power supply 72 on platform 65. The flexible power lead 77 is supported in the sea water by a buoy 78. The other leg of AC power supply 72 is connected to sea water electrode 73 through cable 71. The end of pipeline section 61 near subsea wellhead 67 is also connected to sea water electrode 74. The sea water completes the circuit.

FIG. 3 shows a pipeline part 81 suspended from a platform 85 in a catenary arc to the sea bed 84. Said pipeline section 81 extends from there along the sea bed to join to subsea wellhead 87 with connectors 89 and jumper pipe 88. The pipeline part 1 is electrically insulated from the ambient sea water with an insulating coating and is insulated from the platform 85 with a submerged insulating joint 99. The insulating joint comprises an electric terminal that connects the pipeline part 81 to a cable 52 that extends through conduit 50 and connects to a leg of an AC power supply 92. The other leg of the AC power supply 92 is connected to a sea water electrode through a conduit 51. The end of the pipeline section 81 is also connected to a sea water electrode 94 near the subsea wellhead 87. Sea water thus completes the circuit between the sea water electrodes.

FIG. 4 is an elevation section view of an electrically insulating joint such as joint 79 in FIG. 2 and 99 in FIG. 3. It comprises an insulating joint 20 similar to those in the prior art covered with an insulating coating 22 that extends over the segment 15 of a pipeline which corresponds to a segment of pipeline part 61 in FIGS. 2 and pipeline part 81 in FIG. 3. The insulating joint 20 comprises a terminal 23 that connects the segment 15 of the pipeline to a flexible power lead 17.

FIGS. 5, 6 and 7 show details of pipelines of this invention comprising lengths of pipe joined by field welds.

FIG. 5 shows an elevation cross section view of a pipeline field joint that has been insulated with an insulating material 36 that is field cast inside a sheet metal mold 38, that encloses the weld 32 that joins two vertical pipes 31 that are insulated along the bulk of their length with an insulating coating 37. The insulating coating 36 bonds to the previously applied insulation 37 to form a waterproof, electrically insulating coating that is continuous across the pipeline. This is one embodiment of an electrically insulating field joint for pipelines of this invention that are installed vertically offshore using the "J" lay pipe installation method.

Figure 8:
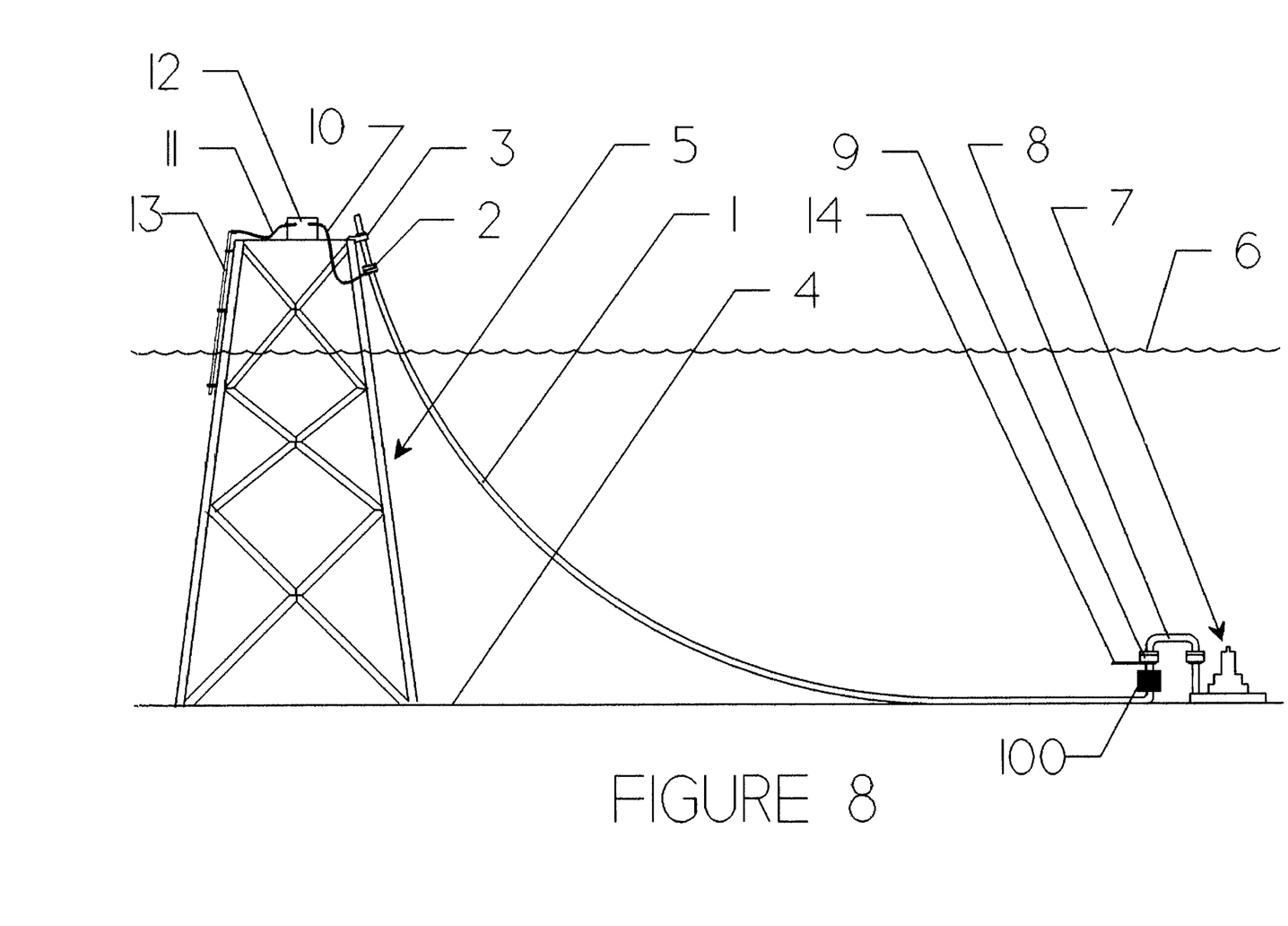
FIG. 8 shown a pipeline suspended from a platform in a catenary to the sea bed, extending from there to a subsea transformer and wellhead.

FIG. 6 shows an end cross section view taken through a pipeline field joint that has been insulated by casting an insulating material 48 in a sheet metal mold 44 that is held in place by bands 43 so that it encloses the field weld that joins two horizontal pipes 41. FIG. 8 shows a pipeline similar to that shown in FIG. 1. FIG. 8 further shows a transformer 100 directly connected in series with the pipeline 1. The primary winding of the transformer 100 is electrically connected to the pipeline 1 which induces power in the secondary coil, that powers other equipment. This is one embodiment of an electrically insulating field joint for pipelines of this invention that are installed offshore horizontally using the "S" lay method. The flexible insert 47 supports the mold under the weight of the pipes 41 as the mold 44 rolls over support rollers on the pipe lay barge.

FIG. 7 shows an elevation section view of a cast field joint taken at section BB in FIG. 6. The insulating material 48 cast around the field weld 42 and the flexible insert 47, and bonds to the insert 48 and the previously applied bulk insulation 46 to form a waterproof electrically insulating coating that is continuous across the pipeline. The insert 47 shortens the axial distance spanned by the mold 44 while the material 48 is curing. The distance is reduced from the length 4a that would exist without the insert 47 to lengths 4b. In some embodiments the mold would be able support the imposed loads without the insert, and in those embodiments the insert would not be used.

The invention claimed is:

1. A heating system for a marine pipeline comprising (a) at least a pipe, (b) a coating that electrically insulates said pipe from ambient sea water, (c) an alternating current electric power supply electrically insulated from said ambient seawater, and (d) first and second electrodes in electrical communication with ambient sea water, wherein a first leg of said power supply is electrically connected to the first electrode and a second leg of said power supply is electrically connected to a point along the length of said pipe, wherein the second electrode is electrically connected to another point on said pipe, whereby alternating current flows through said pipe, electrodes and ambient sea water, wherein the heat generated by alternating current flowing in said pipe is for improving flow of fluids through said pipeline.

2. The heating system of claim 1 wherein said alternating current heating circuit comprises an additional means for generating electric heat that is connected in series with said pipe and said sea water, and is powered by the alternating current flowing through said circuit.

3. The heating system of claim 1 wherein said electrically insulating coating on said pipe also serves to thermally insulate said pipeline and wherein the thickness of said insulating coating is greater than 0.5 inches.

4. The heating system of claim 1 wherein said alternating current heating circuit comprises electrical equipment that is connected in series with said pipe and said sea water, and wherein said equipment is powered by the alternating current flowing though said circuit.

5. The heating system of claim 1 wherein said electrically insulating coating is covered with a submersible insulating coating.

6. The heating system of claim 1 wherein said insulating coating comprises a thermoplastic material.

7. The heating system of claim 1 wherein said insulating coating comprises bitumen.

8. A heating system as claimed in claim 1, wherein said second electrode is electrically connected to said pipe near a first end of said pipe and said alternating current electric power supply is electrically connected to said pipe near a second end of said pipe.

9. A heating system as claimed in claim 1, wherein said second electrode is electrically connected to said pipe between first and second ends of said pipe and said alternating current electric power supply is electrically connected to said pipe near a second end of said pipe.

10. A heating system for a marine pipeline comprising (a) at least a pipe, (b) a coating that electrically insulates said pipe from ambient sea water, (c) an alternating current electric power supply electrically insulated from said ambient sea water, and (d) first and second electrodes in electrical communication with ambient sea water, wherein a first leg of said power supply is electrically connected to the first electrode and a second leg of said power supply is electrically connected to a point along the length of said pipe, wherein the second electrode is electrically connected to another point on said pipe, whereby alternating current flows through said pipe, electrodes and ambient sea water, wherein the heat generated by alternating current flowing in said pipe is for improving flow of fluids through said pipeline, wherein said pipe comprises (a) a series of pipe sections joined by field joints, and wherein said coating comprises a sequence of bulk parts and a sequence of field joint closure parts, wherein each of said bulk parts partially covers each one of said pipe sections, and each of said closure parts covers one of said field joints, and wherein said closure parts close with said bulk parts to complete a continuous electrically insulating whole.

11. The heating system of claim 10, wherein said coating comprises a thermoplastic insulating material.

12. The heating system of claim 10, wherein said field joint closure parts are cast molten around the field joints, wherein the field joint closure parts are fused by heat to said bulk parts.

13. A heating system for a marine pipeline comprising: a) at least a pipe, b) a coating that electrically insulates said pipe from ambient sea water, c) an alternating current electric power supply electrically insulated from said ambient sea water, and c) a return conductor that is grounded to the ambient sea water and electrically connects a first leg of said power supply to a point on said pipe, wherein the second leg of said power supply is electrically connected to a second point on said pipe, whereby alternating current flows through said pipe and said return conductor, wherein the heat generated by the alternating current flow in said pipe is for improving flow of fluids through said pipeline.

14. The heating system of claim 13 wherein said electrically insulating coating on said pipe also serves to thermally insulate said pipe and wherein the thickness of said insulating coating is greater than 0.5 inches.

15. The heating system of claim 13 wherein said insulating coating comprises a thermoplastic material.

16. The heating system of claim 13 wherein said insulating coating comprises bitumen.

17. The heating system of claim 13, wherein said pipe comprise (a) a series of pipe sections joined by field joints, and wherein said coating comprises a sequence of bulk parts and a sequence of field joint closure parts, wherein each of said bulk parts partially covers each one of said pipe sections, and each of said closure parts covers one of said field joints, and wherein said closure parts close with said bulk parts to complete a continuous electrically insulating whole.

18. The heating system of claim 13, wherein said return conductor is sea water.

19. The heating system of claim 13 wherein said alternating current heating circuit comprises an additional means for generating electric heat that is connected in series with said pipe and said return conductor, and is powered by the alternating current flowing through said circuit.

20. The heating system of claim 13 wherein said alternating current heating circuit comprises electrical equipment that is connected in series with said pipe and said sea water, and wherein said equipment is powered by the alternating current flowing though said circuit.

* * * * *